Oct. 21, 1969    R. P. RODGERS    3,474,259

SAMPLE AND HOLD CIRCUIT

Filed Dec. 17, 1965

INVENTOR
ROBERT P. RODGERS

BY  *William Grobman*

ATTORNEY

United States Patent Office 3,474,259
Patented Oct. 21, 1969

3,474,259
SAMPLE AND HOLD CIRCUIT
Robert P. Rodgers, Silver Spring, Md., assignor to Singer-General Precision, Inc., a corporation of Delaware
Filed Dec. 17, 1965, Ser. No. 514,524
Int. Cl. H03f 3/68
U.S. Cl. 307—238          6 Claims

ABSTRACT OF THE DISCLOSURE

In many situations where a varying electrical signal is used for such things as monitoring the operation of several systems, providing input information for digital computers, high-speed communication and the like, multiplexing is used to save equipment. In such systems, circuits which periodically sample the varying signals and hold the sample until the next sampling is made are important. This invention is one such circuit. It comprises two pairs of differentially connected amplifiers arranged so that one pair compensates for drift produced in the other pair. A constant current power supply for one pair of differential amplifiers aids in stabilization. The output comprises push-pull valves with means for limiting the quiescent current through them to improve the overall efficiency of the circuit. Field effect transistors are used to provide large time constants where needed.

---

This invention relates to sampling and holding circuits, and more particularly to circuits for sampling individual analog signals and holding them at the sampled level for a comparatively long interval of time.

In many systems which use analog signals for their operation, one primary example being the various simulators for training persons in the operation and control of aircraft, ships, and other vehicles and machines, newer techniques involve performing the necessary operations on information by digital means. Since the information often originates as analog information and is used as analog information, converters for converting the information, between the analog and the digital systems are needed. A single digital computer (actually, digital information processor would be a better term) can manipulate information from many sources in very short time intervals. Analog information from training devices does not usually vary at a rapid rate, but the instruments and other equipment controlled by the analog information may have low inertia and virtually no storage facilities. This means that the information coming from the digital information processor and the digital-to-analog converter must be directed to the proper instrument and then stored at that level until the next time the same information is available from the converter. To illustrate, in a radar simulator many targets may be shown on the simulated radar screen. Each target requires its own information which locates its position on the screen and the manner in which it is moving. As conditions being simulated change, the information shown on the radar screen must also change. These changes occur at comparatively slow rates. Therefore, if a single digital information processor and d-a converter is used to process information from the radar targets and also from many similar devices, the over-all switching or multiplexing cycle may be quite long. A circuit for each radar target must be provided between the d-a converter and the radar simulator to receive the information specific to each target at the appropriate tmes and store that information iwth little change in value until it again receives new information about the same target. Of course, the above illustration is only that— an example of one type of system in which the circuit of this invention may be used.

It is an object of this invention to provide a new and improved circuit for the sampling and holding of analog information.

It is another object of this invention to provide a new and improved circuit for use in analog systems for receiving and storing on command analog data at prescribed intervals.

It is a further object of this invention to provide a simple and inexpensive circuit module which is suitable for use in many different situations in which analog information is to be received and stored for a finite interval of time.

It is still another object of this invention to provide a solid state circuit which is useable in a large number of situations, with little or no change, for the storage of electrical potentials for a prescribed interval of time.

It is still a further object of this invention to provide a new and improved circuit which is virtually free from potential drift with time and which provides a very stable and inexpensive as well as rugged means for sampling and storing electrical potentials.

Other objects and advantages of this invention will become more apparent as the following description proceeds, which description should be considered together with the accompanying drawings in which.

Figure 1:
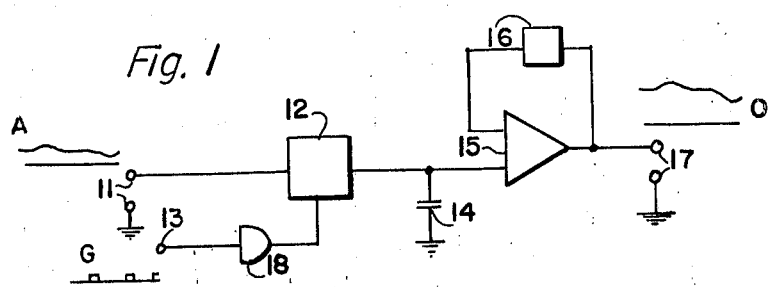
FIG. 1 is a block diagram of the sample and hold circuit of this invention.

Referring now to the drawings in detail, the reference character 11 designates a pair of signal input terminals, one of which is grounded. The ungrounded terminal 11 is connected to the input of an electronic sampling switch 12. A series of control pulses G for the sampling switch 12 are applied to control input terminal 13, which is connected to a gate 18. The output from the gate 18 controls the switching circuit 12 to permit input signals A from the terminals 11 to be applied to one side of a storage capacitor 14, the other side of which is grounded. An amplifier 15 having a feedback path 16 has its signal input connected across the capacitor 14 and supplies an output signal O to a pair of output terminals 17, one of which is grounded.

In operation, the analog signals, shown at A, are applied to the input terminals 11. These analog signals may vary rapidly, but they usually vary at a relatively slow rate and they may be interrupted in nature. Thus, assuming that the input terminals 11 receive signals from a single digital-to-analog converter which is, in turn, supplied from a single digital information processor, the information output from the d-a converter relates to a single analog device for only a short time interval. Then, the output of the d-a converter switches to information which relates to another analog device. The digital processor and the d-a converter are multiplexed to handle the information from and to a large number of analog devices in a given interval of time. The output from the d-a converter, which is being used here as an example of an input device for the circuit of this invention, is directly connected to the input terminals 11. Assuming that a large number of devices shown in FIG. 1 would be used in a single system, the input terminals 11 of all of them would be connected together and to the output from the d-a converter. Electronic sampling switch 12 is normally opened but is closed by the application of a control pulse from the gate 18. When a control pulse is applied to the control input terminal 13, the sampling switch 12 closes to permit the electrical potential applied at that time to the input terminals 11 to be applied across the capacitor 14. When the control pulse on terminal 13 decays, sampling switch 12 opens and disconnects the capacitor 14 from the input. Thus, the amplifier 15 is left as the single device which is connected across the capacitor 14. The input impedance of the amplifier 15 must be of a value such that the combination of the size of the capacitor 14, the amplifier 15 input impedance, and sampling switch 12 open circuit impedance will maintain the charge on the capacitor 14 within the desired limits during the time when the sampling switch 12 is open. When sampling switch 12 closes again, the capacitor 14 will charge to the potential then existing at the input terminals 11. In addition to the input impedance requirements of the amplifier 15, it must be virtually drift-free. A feedback path 16 across the amplifier 15 is provided to set the closed loop gain of the amplifier precisely. At the output terminals 17, an amplified version of the input signal appears and is connected to the device which uses that signal.

Figure 2:
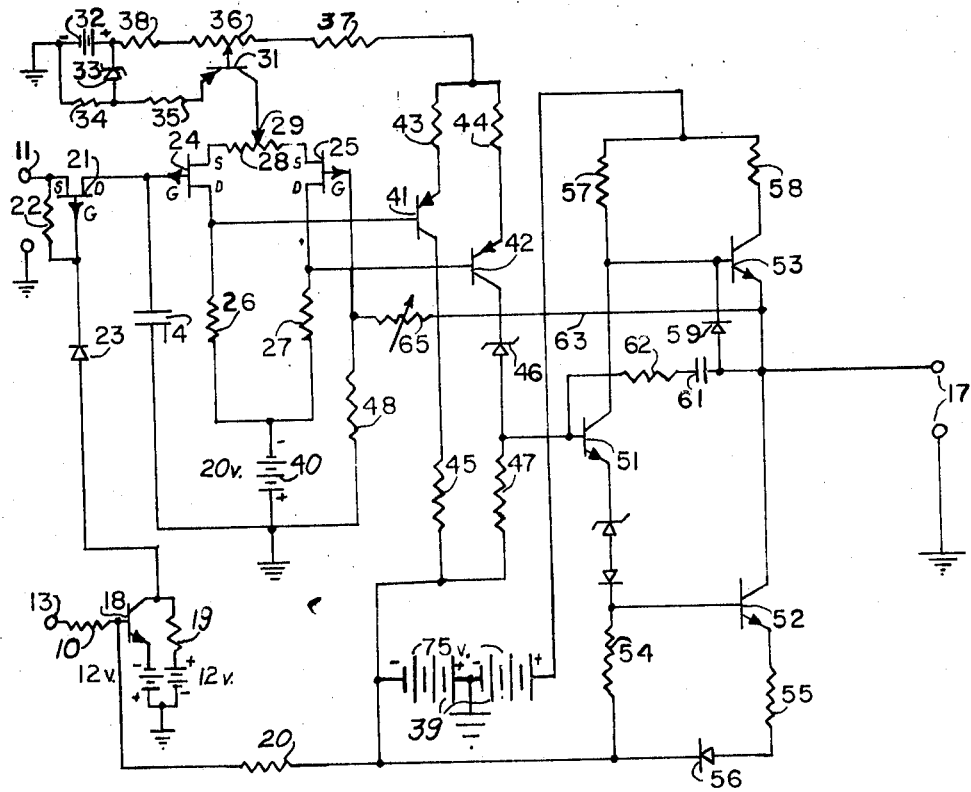
FIG. 2 is a schematic circuit diagram of the circuit of FIG. 1.

One circuit which has been constructed to accomplish the results mentioned above for the system of FIG. 1 is shown in detail in FIG. 2. The same reference characters in both figures designate the same elements. Input terminals 11, shown in FIG. 2 on the left, are connected to ground and to the source electrode of a field effect transistor 21. The transistor 21 comprises the electronic sampling switch 12 of FIG. 1. The drain electrode of the transistor 21 is connected to one side of the storage capacitor 14, the other side of which is connected to ground. The gate electrode of the transistor 21 is connected through a stabilizing resistor 22 to the input terminal 11 and through a diode 23 to the collector electrode of a transistor 18. The collector electrode of the transistor 18 is connected through a load resistor 19 to a source of +12 volts, and the emitter electrode of the same transistor is connected to −12 volts. The base electrode of the transistor 18 is connected through a resistor 10 to the control input terminal 13 and through a resistor 20 to a source 39 of −75 volts. The ungrounded side of the capacitor 14 is also connected to the gate electrode of a field effect transistor 24 which comprises one side of a differentially connected amplifier, the other side of which is a similar field effect transistor 25. The source electrodes of the two transistors 24 and 25 are connected to opposite sides of a variable resistor 28 having a sliding contact 29. The contact 29 is connected to the collector electrode of a transistor 31, the emitter electrode of which is connected to a resistor 35 and a Zener diode 33 to the positive side of a source 32 of 12 volts DC, the negtive side of which is connected through a resistor 34 to the other side of the diode 33. The base electrode of the transistor 36 is supplied with a constant positive potential from the source 32 through the slide contact of a potentiometer 36 and across the Zener diode 33 which acts as a voltage regulator.

The drain electrodes of the two transistors 24 and 25 are connected together through resistors 26 and 27, one side of resistor 26 being connected to the drain electrode of transistor 24, one side of the resistor 27 being connected to the drain electrode of the transistor 25, and the other sides of the resistors 26 and 27 being connected together and to the negative side of a source 40 of 20 volts DC. The output from the transistor 24 is taken from the one side of the resistor 26 and is applied to the base electrode of a transistor 41, and the output from transistor 25 is taken from the one side of the resistor 27 and is applied to the base electrode of a transistor 42. Transistors 41 and 42 form a differentially connected amplifier with the emitter electrodes of each of the two transistors connected to one side of each of two resistors 43 and 44, respectively, the other sides of which are connected together and through the potentiometer 36 and resistors 37 and 38 to the positive terminal of the source 32. The collector electrode of the transistor 41 is connected to one side of a resistor 45, and the collector electrode of the transistor 42 is connected through a Zener diode 46 to one side of a resistor 47. The other sides of the resistors 45 and 47 are connected together and to the negative side of the source 39 or 75 volts DC. The single output from the differentially connected amplifier is taken from the junction of the Zener diode 46 and the resistor 47 and is applied to the input of a phase splitter which comprises transistor 51. The phase splitter 51 supplies the base electrodes of the transistors 52 and 53 which form a push-pull output amplifier. The collector electrode of the transistor 51 is connected through a load resistor 57 to the positive side of the source 39 of 75 volts DC, and the emitter electrode of the same transistor is connected through a Zener diode and a load resistor 54 to the negative side of the source 39. The junction of the collector electrode of the transistor 51 and the resistor 57 is connected across a diode 59 to the base electrode of the transistor 53, and the junction of the diode and the resistor 54 is connected to the base electrode of the transistor 52. The emitter electrode of transistor 53 is connected to the collector electrode of the transistor 52, and to the ungrounded output terminal 17. The emitter electrode of the transistor 52 is connected through a resistor 55 and a diode 56 to the negative side of the source 39. In addition, two feedback paths are provided from the ungrounded output terminal 17. One feedback path comprises a capacitor 61 and a resistor 62 and is connected to the base electrode of the phase splitter transistor 51, and the other path comprises a line 63 and a potentiometer 65 and is connected to the gate electrode of the field effect transistor 25 in the first differential amplifier.

The circuit of FIG. 2 has been designed to accomplish the objects outlined above. Amplification in the over-all circuit may be in the order of a gain of ten. The input potentials range between ±5 volts DC. The output potentials will then range from 0 volts DC to about ±50 volts DC, or that potential which is required to establish full scale in the devices driven by the circuit. Considering the example mentioned above of a system in which information is procesed in digital form and is then converted into analog form for application to the equipment which utilizes it, a digital word may comprise 10 binary bits. Thus, the input variation in potential, ±5 volts, is represented by 1024 units. Each bit represents about ten millivolts. Therefore, to maintain the accuracy of the system, there should be a drift in the system of less than five millivolts per switching cycle. The system is designed to hold a value for an interval of about one second. With slight modifications, this time can easily be doubled. Therefore, during the one second that the value is held, it should change by less than five millivolts. The storage capacitor 14 may have, for example, a value of about 0.1 microfarad. A field effect transistor 21 was chosen as the electron switch because of the high "off" impedance which it exhibits and the fact that it has virtually no saturation voltage drop. However, when it is conducting, the transistor 21 has an impedance of about 1500 ohms. This determines the input charging rate. The time required to charge the capacitor 14 of about 0.1 mf. through the transistor 21 to achieve a charge on capacitor of 0.9995 $E_{in}$ is about eight times the time constant of capacitor 14 and transistor 21. This corresponds to a change in the output of about 100 volts with an error of about 50 millivolts, or the equivalent of one-half bit on the input. Thus, with a capacitor of $0.1 \times 10^{-6}$ f. and a charging impedance of 1500 ohms, the time constant is $150 \times 10^{-6}$ seconds, or 150 microseconds. Since it takes about eight to ten times this time to fully charge the capacitor 14, the minimum conductive time for FET 21 should be in the order of 1500 microseconds. When the transistor 21 is switched "off"; that is, nonconducting, the capacitor 14 tends to discharge through the transistor 24, resistor 26, and transistor 21. Field effect transistors maintain this discharge time at a maximum.

Once the capacitor 14 is charged with the input signal and the switch transistor 21 stops conducting, the potential across the capacitor 14 is applied to the gate electrode of the field effect transistor (FET) 24. The amount of current flowing through this transistor and through its load resistor 26 depends primarily upon the effective conductance of the transistor 24 which is controlled by the amplitude of the input signal applied to the gate electrode. Transistor 31, through which the load current of FET's 24 and 25 must pass, is connected as a constant current device with its base electrode connected to the fixed potential developed across a portion of the potentiometer 36 by the current flowing from the 12 volt source 32. With the voltage of the base electrode relatively fixed, the current through the emitter-collector path of the transistor 31 does not change. This limits the amount of current supplied to the two FET's 24 and 25. When the voltage applied to the gate electrode of the FET 24 increases, the current flowing through the FET 24 increases. This decreases the current available to flow from the transistor 31 through the FET 25. Thus, an effect on FET 24 produces an opposite effect upon FET 25. The voltage applied to the gate electrode of FET 24 is determined by the charge on the storage capacitor 14. The voltage applied to the gate electrode of the FET 25 is determined by the amplitude of the output signal at terminals 17. Each FET 24 and 25 has its own output. The output from FET 24 is applied to the base electrode of transistor 41 and the output from FET 25 is applied to the base electrode of the transistor 42. Thus, as the voltage across the storage capacitor goes up, the voltage applied to the base of transistor 42 goes up and the voltage applied to the base electrode of the transistor 41 goes down. Although the transistors 41 and 42 are differentially connected, an output is taken from only transistor 42 across the resistor 47.

The differentially connected amplifier comprising transistors 41 and 42, the constant current device 31, the feedback path from the commonly connected emitter electrodes of the transistors 41 and 42 to the 12 volt source 32, and the use of a Zener diode 33 across the 12 volt source 32, all contribute to reduce the drift in the amplifier, and in particular, to reduce the thermal drifts in the direct coupled amplifier stages. The Zener diode 33 is connected across the 12 volt source 32 and tends to compensate for changes in the potential across the base to emitter terminals of transistor 31 due to temperature variations. The use of a potentiometer 36 to apply the potential to the base electrode of the constant current device transistor 31 also permits variation in the applied potential to help compensate for drift which occurs over a long interval of time due to aging and the like. Using a common supply path, which incorporates series resistors 34 and 35 to supply power for the FET's 24 and 25 and resistors 36 and 38 to provide power for the transistors 41 and 42, provides a negative feedback path which tends to compensate for drift in the common mode. Further, using a pair of transistors 41 and 42 differentially connected belt taking an output from only one of the transistors 42 provides a drift corrector in transistor 41. The gain of the transistors 41 and 42 lies in the base-collector path. The base-emitter path usually has a maximum gain of unity. Thus, the feedback introduced by the variations in current flowing through the transistor 41, due to changes in the charge in capacitor 14, does not nullify the gain of the transistor 42. The feedback is in the base-emitter path of the transistor 41 while the output is taken from the collector of the transistor 42.

The single output from the transistor 42 is taken across the load resistor 47 and is applied to the base electrode of the transistor 51. Transistor 51 has two outputs, a high gain output from its collector electrode across load resistor 57 which is applied to the base electrode of the transistor 53, and a low gain output taken from its emitter across load resistor 54 and applied to the base electrode of the transistor 52. The output from the transistor 53 is taken from its emitter electrode and is, therefore, of approximately unity gain, whereas the output from transistor 53 is taken from its collector and is high gain. Thus, the over-all effect of the three transistors 51, 52 and 53 is to provide a two-stage amplifier with a phase splitter and the same over-all gain from both sides at the output at terminals 17. The voltage at the output terminals 17 is fed back through line 63, and potentiometer 65 to establish a potential on the gate electrode of the transistor 25. Thus, when the system has stabilized with a fixed potential across the storage capacitor 14, the potentiometers 65 and 28 can be adjusted so that the current flowing through the FET's 24 and 25 are equal. From this starting point, any change in the potential applied to the gate electrode of FET 24 by the capacitor 14 will change the flow of current through the FET 24 and one side of the potentiometer 28. Since a limited and constant amount of current is available for the potentiometer 28, when the current flow through FET 24 changes in one direction, the current flow through the FET 25 must change in the other direction. The change in the current flowing through FET 25 is then transferred to the base electrode of the transistor 42 where it is amplified and is then applied to the output circuit at the base of transistor 51. Drift in the differentially connected circuit comprising transistors 41 and 42 affects both of the transistors in the same manner. Therefore, when the current through the transistor 42 is increased due to temperature changes, for example, the current flowing through the transistor 41 increases in the same manner and by the same amount. This increase in current flow tends to reduce the potential applied across the transistors 41 and 42 due to the increased potential drops produced in resistors 37 and 38 and in potentiometer 36. Thus, the compensation is twice that which it would be if a single amplifier stage were used.

The above described device provides a rugged means for sampling a voltage which exists on a line for short intervals of time by opening the input to the device on command. The sampled signal is used to charge the capacitor 14 through the switch 12. The potential across the capacitor 14 then controls the conduction through one side of a differentially connected amplifier to produce an amplified output which is proportional to the sampled potential. Drift is reduced by the use of differentially connected amplifiers in which one side tends to compensate for drift changes in the other and by means of feedback circuits. The use of field effect transistors 24 and 25 provides a high impedance device which reduces the amount of drain on the capacitor 14 to the point where the loss of potential between sampling cycles is within the desired tolerances. The device of this invention also provides gain sufficient to operate other apparatus without the intervention of additional amplifiers. It is realized that the above specification may indicate to others in the art additional ways in which the principles of this invention may be used without departing from the spirit of this invention. It is, therefore, intended that this invention be limited only by the scope of the appended claims.

What is claimed is:

1. A system for sampling an electrical signal and holding said signal for future use, said system comprising:
   (a) an electrical switch means having an information input, an information output and a control input;
   (b) means for applying a signal to be sampled to said information input and for applying control signals to said control input, said switch means being enabled to pass information from said information input to said information output under the control of said control signals;
   (c) an information storage device connected to said information output to receive information passing through said switch means, said storage device being of such a capacity that it is filled to the extent of the input information available during the time that said control signals cause said switch means to pass information from its information input to its information output so that the information stored in said storage device trully represents the information applied to said information input;

(d) a first differential amplifier comprising a first and a second amplifying stage connected to provide at an output the difference between information applied to two inputs; means for connecting said storage device to the input of said first amplifying stage, said first amplifying stage having an impedance such that the information stored in said storage device does not appreciably leak through said first amplifying stage during such times that said switch is disabled, and means for connecting the input to said second amplifying stage to the output of said system so that information appearing at said system output is fed back and compared with the information in said storage device; and (e) each of said first and second amplifying stages having a main conductive path, means for connecting said main conductive paths of said first and second amplifying stages together and in parallel; a source of electrical energy for energizing said first and second amplifying stages; and a constant current device in series with said source of electrical energy and the parallel main conductive paths of said first and second amplifying devices so that the total amount of current supplied to the parallel paths is relatively constant and is shared by said first and second paths.

2. The system defined in claim 1 further comprising:
(a) a second differentially connected amplifier;
(b) said second differentially connected amplifier comprising a third amplifying stage and a fourth amplifying stage, each of said third and fourth stages having an input, an output and a main conductive path;
(c) means for connecting the main conductive paths of said third and fourth stages together in parallel through similar resistors;
(d) means for applying said source of electrical energy to said commonly connected main conduction paths of said third and fourth stages;
(e) means for connecting the input of said third stage to the output of said first stage, and means for connecting the input of said fourth stage to the output of said second stage;
(f) and means for taking an output from said fourth stage only.

3. The system defined in claim 2 further including:
(a) an output amplifier comprising a phase splitter stage, a first output stage, and a second output stage;
(b) said phase splitter stage comprising a pair of output electrodes and an input electrode, means for connecting said input electrode to the output from said fourth stage;
(c) each of said first and second output stages comprising at least an output electrode and an input electrode;
(d) means for connecting one of said output electrodes of said phase splitter to the input electrode of said first output stage, means for connecting the other output electrode of said phase splitter to the input electrode of said second output stage, and means for connecting the output of said system to the output electrodes of said first and second output stages.

4. The system defined in claim 3 further including:
(a) a feedback path connected between the output of said system and the input of said second stage;
(b) said feedback path including a variable impedance for adjusting the amount of energy applied from said system output to the gate electrode of said second stage.

5. The system defined in claim 1 wherein said electronic switching means comprises a field effect transistor having a source electrode, a drain electrode and a gate electrode, and means for biasing said gate electrode to maintain said field effect transistor normally nonconducting whereby an electrical signal applied to said information input is transferred to said capacitor only upon command.

6. A sample and hold circuit comprising:
(a) an electronic switch comprising an input, an output and a control terminal, means for connecting said input to a source of information to be sampled, means for applying electrical control signals to said control terminal; said switch establishing a direct connection between said input and said output under the control of the control signals applied to said control terminal;
(b) an information storage device connected to the output from said switch, said storage device having a storage capacity such that during the times that said switch is conductive said storage device is filled to the extent possible by the information available at the input;
(c) a first differential amplifier comprising a first amplifier stage and a second amplifier stage, each of said first and second stages having an input, an output, and a main conductive path, means for connecting said storage device to the input of said first stage so that the information stored in said storage device controls the conduction through the main conductive path of said first stage;
(d) a constant current device, means for connecting together in parallel the main conductive paths of said first and second stages, means for connecting the parallel connected main conductive paths of said first and second stages in series with said constant current device so that the output from said constant current device is divided between the conductive paths of said first and second stages;
(e) a second differential amplifier comprising third and fourth amplifier stages, each of said third and fourth stages including an input, an output and a main conductive path, means for connecting the input of said third stage to the output from said first stage; means for connecting the input of said fourth stage to the output from said second stage; means for connecting the main conductive paths of said third and fourth stages together and in parallel; and means for connecting the parallel arrangement of the third and fourth stages conductive paths to said source of electrical energy so that the current drawn by the said third and fourth conductive paths determines the potential applied to said constant current device from said source of energy;
(f) a phase splitter, means for connecting the input to said phase splitter to the output from said fourth stage;
(g) a pair of output stages connected as a push-pull circuit with the inputs to the pair of output stages being taken from the two sides of said phase splitter, means in said push-pull circuit to equalize the quiescent currents flowing therethrough, and means for taking the output of the system from said push-pull circuit; and
(h) a feedback path connected from the output of the system to the input to said second stage, whereby the information stored in said storage device determines the current flowing through said second stage, which in turn determines the current flowing through said second stage, the current flowing through said third and fourth stages further determining the current flowing through said constant current device which determines the sum of the currents flowing through said first and second stages, said system comprising a closed loop system which provides a stable amplification of a sampled input.

References Cited

UNITED STATES PATENTS

| | | | |
|---|---|---|---|
| 3,158,759 | 11/1964 | Jasper | 328—151 X |
| 3,181,013 | 4/1965 | Harris | 328—58 X |
| 3,297,963 | 1/1967 | Halsted | 307—346 X |
| 3,309,618 | 3/1967 | Harris et al. | 330—69 |

NATHAN KAUFMAN, Primary Examiner

U.S. Cl. X.R.

307—235, 246; 328—151; 330—30, 38, 51, 69